United States Patent [19]

DeChellis et al.

[11] Patent Number: 5,352,749
[45] Date of Patent: Oct. 4, 1994

[54] PROCESS FOR POLYMERIZING MONOMERS IN FLUIDIZED BEDS

[75] Inventors: Marc L. DeChellis, Houston; John R. Griffin, Baytown, both of Tex.

[73] Assignee: Exxon Chemical Patents, Inc., Linden, N.J.

[21] Appl. No.: 53,067

[22] Filed: Apr. 26, 1993

Related U.S. Application Data

[63] Continuation-in-part of Ser. No. 854,041, Mar. 19, 1992, abandoned.

[51] Int. Cl.$^5$ .............................................. C08F 2/34
[52] U.S. Cl. ...................................... 526/68; 526/70; 526/87; 526/88
[58] Field of Search .................. 526/68, 70, 87, 88

[56] References Cited

U.S. PATENT DOCUMENTS 4,588,790  5/1986  Jenkins, III et al. ................. 526/70

FOREIGN PATENT DOCUMENTS 0024933  3/1981  European Pat. Off. .
0089691  9/1983  European Pat. Off. .
0183154  4/1986  European Pat. Off. .
0241947  10/1987  European Pat. Off. .

*Primary Examiner*—Joseph L. Schofer
*Assistant Examiner*—David Wu
*Attorney, Agent, or Firm*—Jaimes Sher

[57] ABSTRACT

The invention is directed toward polymerizing or copolymerizing alpha-olefins either alone or in combination with one or more other alpha-olefins in a gas phase reactor having a fluidized bed and a fluidizing medium such that the fluidizing medium entering the reactor comprises a gas and a liquid phase.

43 Claims, 5 Drawing Sheets

PROCESS FOR POLYMERIZING MONOMERS IN FLUIDIZED BEDS

CROSS-REFERENCE TO RELATED APPLICATION

This patent application is a continuation-in-part of U.S. Ser. No. 07/854,041 filed Mar. 19, 1992, now abandoned.

FIELD OF THE INVENTION

This present invention relates to a process for the gas phase polymerization of olefins in fluidized bed reactors. The present invention allows for substantial savings in energy and capital cost by significantly increasing the polymer production rate capacity of a given sized reactor.

BACKGROUND OF THE INVENTION

The discovery of the process for the production of polymers in fluidized beds has provided a means for the production of a diverse array of polymers. Using a gas fluidized bed polymerization process substantially reduces the energy requirements as compared to other processes and most importantly reduces the capital investment required to run such a process.

Gas fluidized bed polymerization plants generally employ a continuous cycle. In one part of the cycle, in a reactor a cycling gas stream is heated by the heat of polymerization. This heat is removed in another part of the cycle by a cooling system external to the reactor.

Generally in a gas fluidized bed process for producing polymers from monomers a gaseous stream containing one or more monomers is continuously passed through a fluidized bed under reactive conditions in the presence of a catalyst. This gaseous stream is withdrawn from the fluidized bed and recycled back into the reactor. Simultaneously, polymer product is withdrawn from the reactor and new monomer is added to replace the polymerized monomer.

It is important to remove heat generated by the reaction in order to maintain the temperature of the gaseous stream inside the reactor at a temperature below the polymer and catalyst degradation temperatures. Further, it is important to prevent agglomeration or formation of chunks of polymer that cannot be removed as product. This is accomplished through controlling the temperature of the gaseous stream in the reaction bed to a temperature below the fusion or sticking temperature of the polymer particles produced during the polymerization reaction. Thus, it is understood that the amount of polymer produced in a fluidized bed polymerization process is directly related to the amount of heat that can be withdrawn from a reaction zone in a fluidized bed within the reactor.

Conventionally, heat has been removed from the gaseous recycle stream by cooling the stream outside the reactor. A requirement of a fluidized bed process is that the velocity of the gaseous recycle stream be sufficient to maintain the fluidized bed in a fluidized state. In a conventional fluidized bed reactor, the amount of fluid circulated to remove the heat of polymerization is greater than the amount of fluid required for support of the fluidized bed and for adequate mixing of the solids in the fluidized bed. However, to prevent excessive entrainment of solids in a gaseous stream withdrawn from the fluidized bed, the velocity of the gaseous stream must be regulated. Also, in a steady state fluidized bed polymerization process wherein the heat generated by the polymerization reaction is proportional to the rate of polymer production, the heat generated is equal to the heat absorbed by the gaseous stream and lost by other means such that the bed temperature remains constant.

For a time, it was thought that the temperature of the gaseous stream external to the reactor otherwise known as the recycle stream temperature could not be decreased below the dew point of the recycle stream. The dew point of the recycle stream is that temperature at which liquid condensate begins to form in the gaseous recycle stream. It was believed that introducing a liquid into a gas phase recycle stream in a fluidized bed polymerization process would inevitably result in plugging of the recycle stream lines, the heat exchanger, the area below the fluidized bed or the gas distributor plate. As a consequence of operating at a temperature above the dew point of the recycle stream to avoid the problems associated with liquid being in the gaseous recycle stream, production rates in commercial reactors could not be significantly increased without enlarging reactor diameters.

In the past there was concern that excessive amounts of liquid in the recycle stream would disrupt the fluidization process to the extent that the fluidized bed would collapse resulting in the sintering of solid polymer particles into a solid mass causing the reactor to shut down. This widely held belief to avoid liquid in the recycle stream can be seen from the following: U.S. Pat. Nos. 3,922,322, 4,035,560, 4,359,561, 5,028,670 and European Patent Application Nos. 0 050 477, 0 100 879.

Contrary to this belief, it has been demonstrated, as disclosed by Jenkins, III, et al. in U.S. Pat. No. 4,543,399 and related U.S. Pat. No. 4,588,790 that a recycle stream can be cooled to a temperature below the dew point in a fluidized bed polymerization process resulting in condensing a portion of the recycle stream. The disclosures of these two Jenkins, III, patents are incorporated herein by reference. The resulting stream containing entrained liquid is then returned to the reactor without the aforementioned agglomeration and/or plugging phenomena believed to occur when a liquid is introduced into a fluidized bed polymerization process. This process of purposefully introducing a liquid into a recycle stream is known in the industry as a "condensed mode" operation in a gas phase polymerization process.

The above-mentioned U.S. patents to Jenkins, III, et al. disclose that when a recycle stream temperature is lowered to a point below its dew point in "condensed mode" operation, an increase in polymer production is possible, as compared to production in a non-condensing mode because of increased cooling capacity. Also, Jenkins, III, et al. found that a substantial increase in space time yield, the amount of polymer production in a given reactor volume, can be achieved by operating in "condensed mode" with little or no change in product properties.

The liquid phase of the two-phase gas/liquid recycle stream mixture in "condensed mode" remains entrained or suspended in the gas phase of the mixture. The cooling of the recycle stream to produce this two-phase mixture results in a liquid/vapor equilibrium. Vaporization of the liquid occurs only when heat is added or pressure is reduced. The increase in space time yields achieved by Jenkins, III, et al. are the result of this increased cooling capacity of the recycle stream which, in turn, is due both to the greater temperature differential between the entering recycle stream and the fluidized bed temperature and to the vaporization of condensed liquid entrained in the recycle stream.

Jenkins, et al. illustrate the difficulty and complexity of control in general and of trying to extend the stable operating zone to optimize the space time yield in a gas phase reactor.

In Jenkins, et al. the recycle gas is cooled and added to the reactor at a temperature below the dew point so that condensed fluids evaporate inside the reactor. The cooling capacity of the recycle gas can be increased further while at a given temperature of the cooling heat transfer medium. One option described is to add non-polymerizing materials (isopentane) to increase the dew point. Because of greater cooling more heat can be removed and therefore higher space time yields are said to be possible. Jenkins, et al. recommends not exceeding 20 weight percent, preferably 2 to 12 weight percent, of condensed liquid in the recycle gas. Some of the potential hazards disclosed include the formation of "mud", maintaining a sufficiently high recycle gas speed or avoiding accumulation of liquid on a distributor plate. Jenkins, et al. is silent on where upper limits for non-polymerizable or polymerizable condensable materials lie and the question of how to optimize the space time yield using condensed mode.

A gas fluidized bed reactor may be controlled to give the desired melt index and density for the polymer at an optimum production. Great care is generally taken to avoid conditions which can lead to formation of chunks or sheets or, in a worse case, an unstable fluidized bed which collapses, or causes polymer particles to fuse together. The control of a fluidized bed therefore has to be exercised to reduce chunking and sheeting and to prevent bed collapse or a need to terminate the reaction and shut down the reactor. This is the reason why commercial scale reactors are designed to operate well within proven stable operating zones, and why the reactors are used in a carefully circumscribed fashion.

Even within the constraints of conventional, safe operation, control is complex adding further to the difficulty and uncertainty of experimentation if one wishes to find new and improved operating conditions.

There are target values, determined by the polymer and the catalyst, for the operating temperature, the ratio of comonomer(s) to monomer and the ratio of hydrogen to monomer. The reactor and cooling system are contained within pressure vessels. Their contents are monitored, without unduly interfering with fluidization by measuring amongst others (1) the pressure at the top; (2) pressure differential at various heights along the bed, (3) temperature upstream of the bed; (4) temperature in the fluidized bed and temperature downstream of the bed as well as (5) the gas composition and (6) gas flow rate. These measurements are used to control the catalyst addition, the monomer partial pressure and velocity of the recycle gas amongst others. Polymer removal is constrained in certain cases by the settled bulk density (non-fluidized) or the fluidized bulk density depending on plant design and these too must be watched as well as the ash level in the polymer. The plant is a closed system. In operation changes in the process of one or more of the measured values lead to consequential changes elsewhere. In the design of plant the optimization of capacity depends on the most restricting element in the overall design.

There is no generally accepted view as to what causes chunking or sheeting. Obviously some fusing together of the polymer particles is involved, possibly because of insufficient heat transfer caused by inadequate fluidization in the fluidized bed. However, no clear correlations have thus far been found between individual settings and measurements and the occurrence of chunking and sheeting. The entirety of the measured values and controls is used therefore conventionally to stay within known, safe operating areas for a given plant design.

Large scale gas phase plants are expensive and highly productive. Risks associated with experimentation in such plants are high because downtime is costly. Therefore it is difficult to explore design and operating boundaries experimentally in view of the costs and risks.

It will be desirable to provide a method of determining a stable operating condition for gas fluidized bed polymerization to facilitate optimum design of the plant and the determination of desirable process conditions in a given plant design. It would also be desirable to provide a gas fluidized bed polymerization process giving a maximum reactor productivity.

It is hence amongst the aims of the invention to help determine stable operating zones for a gas fluidized bed process and plant design, to find criteria for running a process safely with low risk of malfunction and at the same time high reactor productivities, and/or to avoid any constriction in the overall plant capacity due to the reactor productivity.

SUMMARY OF THE INVENTION

This invention relates to a process for polymerizing alpha-olefins in a gas phase reactor at significantly higher production rates than herefore envisaged. The invention is directed toward a process for polymerizing alpha-olefins in a gas phase reactor having a fluidized bed and a fluidizing medium where the level of liquid in the fluidizing medium is greater than 20 weight percent based on the total weight of the fluidizing medium.

The invention is also directed toward a process for polymerizing alphaolefins in a gas phase reactor having a fluidized bed and a fluidizing medium such that the enthalpy change of the fluidizing medium exiting and entering the reactor is greater than 40 Btu/lb.

The invention further provides a process for polymerizing alpha-olefins in a gas phase reactor at a production rate greater than about 500 lb/hr-ft$^2$.

This invention in another embodiment relates to a method for determining stable operating conditions of a gas phase fluidized bed polymerization reactor by identifying a property useful to determine stability of a fluidized bed and controlling the composition of a fluidizing medium or recycle stream to establish a range of values for the property to maintain the stable operating condition.

The invention in another embodiment is also directed toward a process for controlling a gas phase fluidized bed polymerization reactor by monitoring a condition of the reactor indicative of an onset of a failure condition and controlling the composition of a fluidizing medium or recycle stream in response to the onset to avoid the occurrence of the failure condition. In a preferred embodiment a ratio of a fluidized bulk density (FBD) to settled bulk density (SBD) is monitored. This ratio is maintained above about 0.59.

The invention still further provides in another embodiment a method of determining stable operating conditions of a gas fluidized bed polymerization reactor operating in condensed mode which comprises observing fluidized bulk density changes in the reactor associated with changes in the composition of the fluidizing medium; and increasing the cooling capacity of the recycle stream without exceeding the level at which a reduction in the fluidized bulk density becomes irreversible. As a general rule a reduction in the ratio of FBD to SBD to less than 0.59 may involve risk of fluidized bed disruption and is to be avoided.

In another embodiment of the invention there is provided a gas fluidized bed polymerization process for the polymerization of polymer by passing a gaseous stream comprising monomer through a fluidized bed reactor in the presence of a catalyst under reactive conditions, to produce polymeric product and a stream comprising unreacted monomer gases, compressing and cooling said stream, mixing said stream with feed components and returning a gas phase and a liquid phase to said reactor, the improvement which comprises cooling said stream such that the liquid phase is greater than 15 percent preferably greater than 20 percent by weight of the total weight of the returned stream and the stream composition is such that the ratio of fluidized bulk density to settled bulk density is maintained above at least about 0.59.

BRIEF DESCRIPTION OF THE DRAWINGS

The foregoing objects, features, and advantages of this invention will become clearer and more fully understood when the following detailed description is read in conjunction with the accompanying drawings, in which.

DETAILED DESCRIPTION OF THE INVENTION

Figure 1:
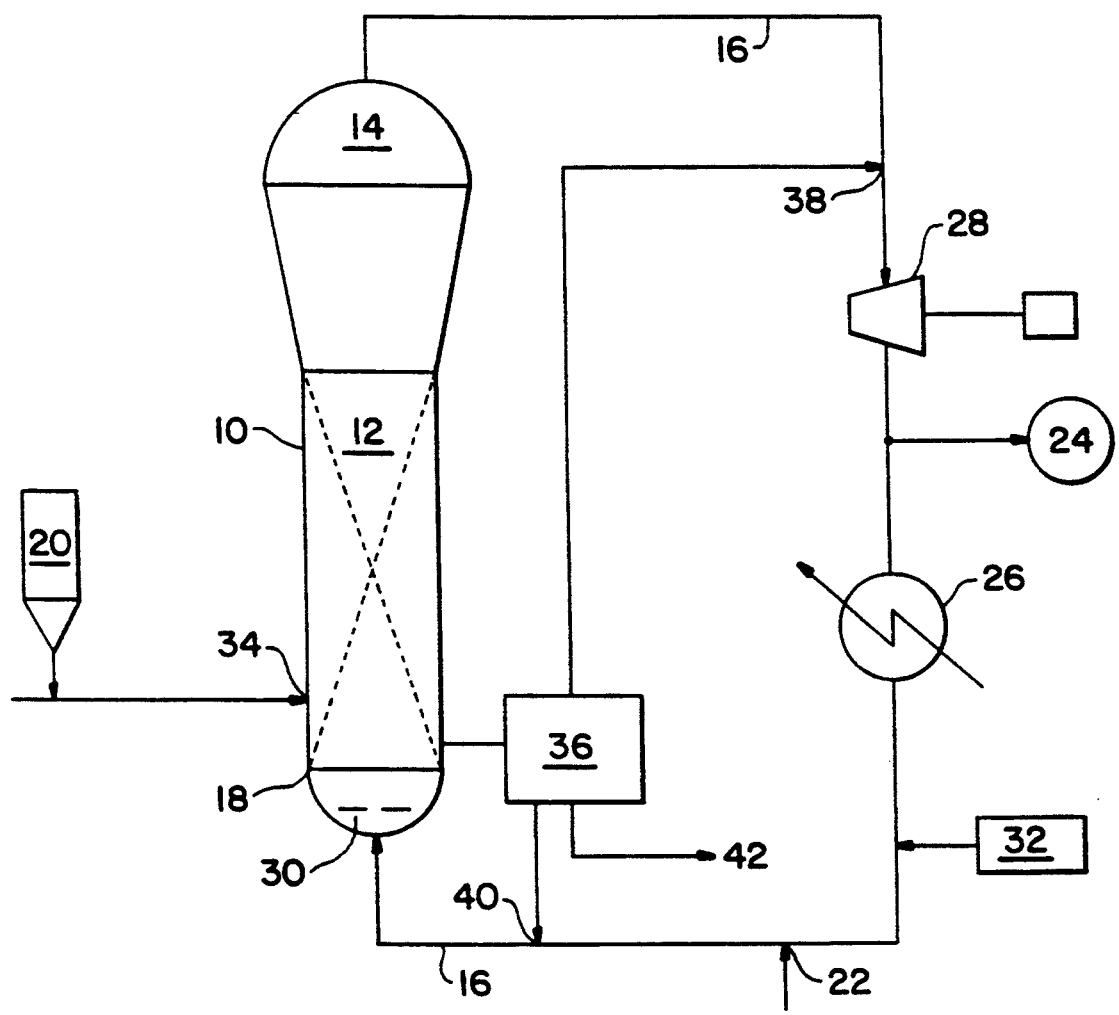
FIG. 1 is a schematic illustration of the preferred embodiment of the reactor used in the practice of the improved gas fluidized bed polymerization process for the production of polymers of this present invention.

In the description which follows, like parts are indicated throughout the specification and drawing with the same reference numerals, respectively. The drawing is not necessarily to scale, and certain parts have been exaggerated to better illustrate the improved process of this invention.

This invention is not limited to any particular type or kind of polymerization or copolymerization reaction but is particularly well suited to the polymerization reactions involving the polymerization of one or more of the monomers, for example olefin monomers of ethylene, propylene, butene-1, pentene-1, 4-methylpentene-1, hexene-1, octene-1 and styrene. Other monomers can include polar vinyl, conjugated and non-conjugated dienes, acetylene and aldehyde monomers.

The catalysts employed in the improved process can include coordinated anionic catalysts, cationic catalysts, free-radical catalysts, anionic catalysts and include a transition metal component or a metallocene component including single or multiple cyclopentadienyl components reacted with either a metal alkyl or alkoxy component or an ionic compound component. These catalysts include partially and fully activated precursor compositions and those catalysts modified by prepolymerization or encapsulation.

Although, as previously stated, this present invention is not limited to any specific type of polymerization reaction, the following discussion of the operation of the improved process is directed to the gas phase polymerization of the olefin-type monomers, for example polyethylene, where this present invention has been found to be particularly advantageous. A significant increase in the reactor productivity is possible without an adverse effect on the product quality or properties.

To achieve higher cooling capacities, and hence higher reactor productivity it may be desirable to raise the dew point of the recycle stream to permit a larger increase in the heat removed from the fluidized bed. For the purposes of this application the terms recycle stream and fluidizing medium are interchangeable. The dew point of the recycle stream can be increased by increasing the operating pressure of the reaction/recycle system and/or increasing the percentage of condensable fluids and decreasing the percentage of non-condensable gases in the recycle stream in the manner disclosed by Jenkins, et al. U.S. Pat. Nos. 4,588,790 and 4,543,399. The condensable fluid may be inert to the catalyst, reactants and the polymer product produced; it may also include comonomers. The condensable fluid can be introduced into the reaction/recycle system at any point in the system, as will be later illustrated from FIG. 1. For the purposes of this patent application the term condensable fluids include saturated or unsaturated hydrocarbons. Examples of suitable inert condensable fluids are readily volatile liquid hydrocarbons, which may be selected from saturated hydrocarbons containing from 2 to 8 carbon atoms. Some suitable saturated hydrocarbons are propane, n-butane, isobutane, n-pentane, isopentane, neopentane, n-hexane, isohexane, and other saturated $C_6$ hydrocarbons, n-heptane, n-octane and other saturated $C_7$ and $C_8$ hydrocarbons or mixtures thereof. The preferred inert condensable hydrocarbons are $C_5$ and $C_6$ saturated hydrocarbons. The condensable fluids may also include polymerizable condensable comonomers such as olefins, diolefins or mixtures thereof including some of the aforementioned monomers which may be partially or entirely incorporated in the polymer product.

In practicing the invention, the amount of gas in the recycle stream and the velocity of the recycle stream should be maintained at levels sufficient to keep the liquid phase of the mixture suspended in the gas phase until the recycle stream enters the fluidized bed, so that liquid does not accumulate in the bottom head of the reactor below the distributor plate. The velocity of the recycle stream must also be high enough to support and mix the fluidized bed within the reactor. It is also desirable that the liquid entering the fluidized bed be dispersed and vaporized quickly.

Controlling the composition, temperature, pressure and superficial velocity of the gas in relation to the composition and physical characteristics of the polymer is important in maintaining a viable fluidized bed. A viable fluidized bed or a stable operating condition is defined as fluidized bed of particles that are suspended and well-mixed in a stable state under reactive conditions without the formation of significant quantities of agglomerates (chunks or sheets) which would disrupt the reactor or downstream process operations.

In the one preferred embodiment more than 15 weight percent, preferably greater than 20 weight percent, of the recycle stream may be condensed, or be in a liquid phase without encountering disruption of the fluidization process provided the safe operating boundaries of the stable operating zones determined with the help of fluidized bed bulk density measurements are not exceeded.

During the polymerization process, a minor portion (typically less than about 10 percent) of the gaseous stream flowing upward through the fluidized bed reacts. That major portion of the stream that does not react passes into a region above the fluidized bed called the freeboard zone which may be a velocity reduction zone. In the freeboard zone, the larger solid polymer particles which are projected above the bed by eruption of gas bubbles through the surface or entrained in the gas stream are allowed to fall back into the fluidized bed. The smaller solid polymer particles, known in the industry as "fines", are withdrawn with the recycle stream because their terminal settling velocities are lower than the velocity of the recycle stream in the freeboard zone.

The process operating temperature is set or adjusted to a temperature below the fusion or sticking temperature of polymer particles produced. Maintaining this temperature is important to prevent the plugging of the reactor by polymer chunks that grow rapidly if the temperature reaches high levels. These chunks of polymer can become too large to be withdrawn from the reactor as a polymer product and cause process and reactor failure. Also, chunks entering the downstream handling process of polymer product can disrupt, for example, transfer systems, drying units or extruders.

In one preferred embodiment of this present invention, the entry point for the recycle stream is preferably below the fluidized bed so as to provide a uniform flow of the recycle stream to maintain the fluidized bed in a suspended condition and to ensure uniformity of the recycle stream passing upwardly throughout the fluidized bed. In another embodiment of the present invention, the recycle stream can be divided into two or more separate streams, one or more of which can be introduced directly into the fluidized bed provided that the gas velocity below and through the fluidized bed is sufficient to keep the bed suspended. For example, the recycle stream can be divided into a liquid and a gas stream which can then be separately introduced into the reactor.

In the practice of the improved process of this invention, the recycle stream comprising a mixture of a gas phase and a liquid phase within the reactor below the distributor plate can be formed by separately injecting a liquid and recycle gas under conditions which will produce a stream comprising both phases.

The advantages of this invention are not limited to the production of polyolefins. Thus, this invention can be practiced in connection with any exothermic reaction carried out in a gas fluidized bed. The advantages of a process operating in condensed mode over other processes generally increase directly with the nearness of the dew point temperature of the recycle steam to the reaction temperature within the interior of the fluidized bed. For a given dew point, advantages of the process may increase directly with the percentage of liquid in the recycle stream returned to the reactor. The invention allows high percentages of liquid to be used in the process.

A gas fluidized bed reactor which is particularly well suited to production of polymers by the process of the present invention is best illustrated in the accompanying drawing, generally designated in FIG. 1 by numeral 10. It should be noted that the reaction system depicted in FIG. 1 is intended to be merely exemplary. The present invention is well suited for any conventional fluidized bed reaction systems.

Referring now to FIG. 1, the reactor 10 comprises a reaction zone 12 and a freeboard zone which in this instance is also a velocity reduction zone 14. The height to diameter ratio of the reaction zone 12 can vary depending on the desired production capacity and residence time. The reaction zone 12 includes a fluidized bed comprising growing polymer particles, existing formed polymer particles and small amounts of catalyst. The fluidized bed in the reaction zone 12 is supported by a recycle stream or fluidizing medium 16 generally made up from feed and recycle fluids. The recycle stream enters the reactor through a distributor plate 18 in the bottom section of the reactor which aids in the uniform fluidization and the support of the fluidized bed in the reaction zone 12. In order to maintain the reaction zone fluidized bed 12 in a suspended and viable state, the superficial gas velocity (SGV) of the gas flow through the reactor generally exceeds the minimum flow required for fluidization which is typically from about 0.2 ft/sec (0.061 m/s) to 0.5 ft/sec (0.153 m/s). Preferably, the SGV must be maintained at not less than about 0.7 ft/sec (0.214 m/s), and even more preferably not less than 1.0 ft/sec (0.305 m/s). The SGV should preferably not exceed 5.0 ft/sec (1.5 m/s), especially 3.5 ft/sec (1.07 m/s).

Polymer particles in the reaction zone 12 help to prevent the formation of localized "hot spots" and entrap and distribute catalyst particles throughout the fluidized bed. In operation, on start up, the reactor 10 is charged with a base of polymer particles before the recycle stream 16 flow is introduced. These polymer particles are preferably the same as the new polymer particles to be produced, however, if different, they are withdrawn with the newly formed first product after initiation of recycle and catalyst flows and establishment of reaction. This mixture is generally segregated from the later essentially new production for alternate disposition. The catalysts used in the improved process of this invention are usually sensitive to oxygen, therefore, the catalyst is preferably stored in a catalyst reservoir 20 under a blanket of a gas, inert to the stored catalyst, such as, but not limited to nitrogen or argon.

Fluidization of the fluidized bed in the reaction zone 12 is achieved by the high rate at which the recycle stream 16 flows into and through the reactor 10. Typically in operation, the rate of the recycle stream 16 is approximately ten to fifty times the rate at which the feed is introduced into the recycle stream 16. This high rate of the recycle stream 16 provides the superficial gas velocity necessary to suspend and mix the fluidized bed in the reaction zone 12 in a fluidized state.

The fluidized bed has a general appearance similar to that of a vigorously boiling liquid, with a dense mass of particles in individual motion caused by percolation and bubbling of gas through the fluidized bed. As the recycle stream 16 passes through the fluidized bed in the reaction zone 12, there is a pressure drop. This pressure drop is equal to or slightly greater than the weight of the fluidized bed in the reaction zone 12 divided by the cross-sectional area of the reaction zone 12, therefore making the pressure drop dependent on the reactor geometry.

Again referencing FIG. 1, the make-up feed enters the recycle stream 16 at, but not limited to, a point 22. A gas analyzer 24 receives gas samples from the recycle stream line 16 and monitors the composition of the recycle stream 16 passing there-through. The gas analyzer 24 is also adapted to regulate the composition of the recycle stream line 16 and the feed to maintain a steady state in the composition of the recycle stream 16 in the reaction zone 12. The gas analyzer 24 usually analyzes samples taken from the recycle stream line 16 at a point between the freeboard zone 14 and a heat exchanger 26, preferably, between a compressor 28 and the heat exchanger 26.

The recycle stream 16 passes upward through the reaction zone 12 adsorbing heat generated by this polymerization process. That portion of the recycle stream 16 that does not react in the reaction zone 12 exits the reaction zone 12 and passes through the velocity reduction or freeboard zone 14. As previously described, in this region, the velocity reduction zone 14, a major portion Of entrained polymer drops back into the fluidized bed reaction zone 12 thereby reducing the carry-over of solid polymer particles into the recycle stream line 16. The recycle stream 16 once withdrawn from the reactor above the freeboard zone 14 is then compressed in compressor 28 and passes through the heat exchanger 26, where heat generated by the polymerization reaction and gas compression are removed from the recycle stream 16 before returning the recycle stream 16 back to the reaction zone 12 in the reactor 10. The heat exchanger 26 is conventional in type and can be placed within the recycle stream line 16 in either a vertical or horizontal position. In an alternative embodiment of this invention, more than one heat exchanging zone or compression zone within the recycle stream line 16 may be included.

Referring back to FIG. 1, the recycle stream 16 upon exiting the heat exchanger 26 returns to the bottom of the reactor 10. Preferably, a fluid flow deflector 30 is positioned below the gas distributor plate 18. The fluid flow deflector 30 prevents polymer from settling out into a solid mass and maintains entrainment of liquid and polymer particles within the recycle stream 16 below the distributor plate 18. The preferred type of fluid flow deflector plate is annular disc in shape, for example, the type described in U.S. Pat. No. 4,933,149. Using an annular type disc provides both a central upward and outer peripheral flow. The central upward flow assists in the entrainment of liquid droplets in the bottom head and the outward peripheral flow assists in minimizing buildup of polymer particles in the bottom head. The distributor plate 18 diffuses the recycle stream 16 to avoid the stream entering the reaction zone 12 in a centrally disposed upwardly moving stream or jet that would disrupt fluidization of the fluidized bed in the reaction zone 12.

The temperature of the fluidized bed is set dependent on the particle sticking point but is basically dependent on three factors: (1) the catalyst activity and rate of catalyst injection which controls the rate of polymerization and the attendant rate of heat generation, (2) the temperature, pressure and composition of recycle and makeup streams introduced into the reactor and (3) the volume of the recycle stream passing through the fluidized bed. The amount of liquid introduced into the bed either with the recycle stream or by separate introduction as described previously especially affects the temperature because the liquid vaporizes in the reactor and serves to reduce the temperature of the fluidized bed. Usually the rate of catalyst addition is used to control the rate of polymer production.

The temperature of the fluidized bed in the reaction zone 12 in the preferred embodiment remains constant in a steady state by continuously removing the heat of reaction. A steady state of the reaction zone 12 occurs when the amount of heat generated in the process is balanced with the amount of heat removed. This steady state requires that the total quantity of material entering the polymerization process is balanced by the amount of polymer and other material removed. Consequently, the temperature, the pressure, and the composition at any given point in the process is constant with time. There is no significant temperature gradient within most of the fluidized bed in the reaction zone 12, however, there is a temperature gradient in the bottom of the fluidized bed in the reaction zone 12 in the region above the gas distributor plate 18. This gradient results from the difference between the temperature of the recycle stream 16 entering through the distributor plate 18 at the bottom of the reactor 10 and temperature of the fluidized bed in the reaction zone 12.

Efficient operation of the reactor 10 requires good distribution of the recycle stream 16. Should growing or formed polymer and catalyst particles be allowed to settle out of the fluidized bed, fusion of the polymer can occur. This can result, in an extreme case, in the formation of a solid mass throughout the reactor. A commercial-sized reactor contains thousands of pounds or kilograms of polymer solids at any given time. The removal of a solid mass of polymer of this magnitude would entail great difficulty, requiring substantial effort and an extended downtime. By determining stable operating conditions with the help of FBD measurement improved polymerization processes can be performed in which the fluidization and support of fluidized bed in the reaction zone 12 within the reactor 10 are maintained.

In the preferred embodiment, variations in the fluidized bulk density (FBD) for a given grade of polymer and/or catalyst composition are used to optimize process conditions and plant design. The fluidized bulk density is the ratio of the measured pressure drop upward across a centrally fixed portion of the reactor to the height of this fixed portion. It is a mean value which may be greater or less than the localized bulk density at any point in the fixed reactor portion. It should be understood that under certain conditions known to those skilled in the art, a mean value may be measured which is greater or less than the localized bed bulk density.

Applicants have discovered that as the concentration of condensable component is increased in the gaseous stream flowing through the bed, an identifiable point may be reached beyond which there is danger of failure of the process if the concentration is further increased. This point is characterized by an irreversible decrease in the fluidized bulk density with an increase in condensable fluid concentration in the gas. The liquid content of the recycle stream entering the reactor may not be directly relevant. The decrease in fluidized bulk density generally occurs with no corresponding change in the settled bulk density of the final product granules. Thus, the change in fluidization behavior reflected by the decrease in fluidized bulk density apparently does not involve any permanent change in the characteristics of the polymer particles.

The gas condensable fluid concentrations at which decreases in fluidized bulk density occur depend upon the type of polymer being produced and other process conditions. They may be identified by monitoring the fluidized bulk density as condensable fluid concentrations in the gas are increased for a given type of polymer and other process conditions.

The fluidized bulk density depends on other variables in addition to the condensable fluid concentration in the gas, including for example the superficial velocity of the gas flowing through the reactor, the fluidized bed height and the settled bulk density of the product as well as gas and particle densities, temperature and pressure. Thus, in tests to determine changes in fluidized bulk density attributable to changes in gas condensable fluid concentration, significant changes in other conditions should be avoided. Therefore, it would not be beyond the scope of this invention to monitor these other variables from which fluidized bulk density can be determined or affects bed instabilities. For the purposes of this application monitoring or maintaining fluidized bulk density includes monitoring or maintaining those variables described above that affect fluidized bulk density or are used to determine fluidized bulk density.

While some modest drop in fluidized bulk density may be accommodated without the loss of control, further changes in gas composition or other variables which also increase the dew point temperature may be accompanied by an irreversible decrease in the fluidized bulk density, development of "hot spots" in the reactor bed, formation of fused agglomerates and eventual shutdown of the reactor.

Other practical consequences directly related to the reduction of the fluidized bulk density include a reduced polymer capacity of a fixed-volume reactor discharge system and reduced polymer/catalyst reactor residence time at constant polymer production rate. The latter may, for a given catalyst, reduce the catalyst productivity and increase the level of catalyst residues in the product polymer. In a preferred embodiment it is desirable to minimize the condensable fluid concentration in the gas for a given target reactor production rate and associated cooling requirement.

Using such fluidized bulk density variations, stable operating conditions can be defined. Once a suitable composition has been identified, the composition may be used to achieve much higher cooling capacities for the recycle stream (without encountering bed instabilities) by cooling that composition to a greater degree. Condensable, non-polymerizable materials may be added in appropriate amounts for a particular grade to achieve high reactor productivity whilst preserving good conditions in the fluidized bed by staying within the so determined stable operating zone. High reactor productivity can be achieved in a process or, in terms of plant design, a large capacity plant can be designed with a relatively small reactor diameter or existing reactors can be modified to provide increased capacity without changing the reactor size.

At higher reactor productivities it has been found that, staying within the boundaries defined by the acceptable fluidized bulk density changes, levels of condensed liquid well over 15%, 20%, 22%, 25% or even 30% can be accommodated whilst avoiding significant levels of chunking or sheeting resulting from fluidized bed disruption. The levels of condensed liquid based on the total weight of the recycle stream or fluidizing medium is in the range of between 15–50 weight percent, preferably greater than 20 to 50 weight percent and even more preferably 22–50 weight percent, and most preferably 25–50 weight percent.

Preferably the fluidized bulk density is observed by using a pressure difference measurement from a part of the fluidized bed not prone to disturbances over the distributor plate. Whereas conventionally fluidized bulk density variations in the lower part of the bed can be taken to be indicative of bed disruption over the distributor plate, with the upper fluidized bulk density measured remote from the distributor plate being used as a stable reference, it has now surprisingly been found that the changes in the upper fluidized bulk density correlate to change in the composition of the stream and can be used to find and define stable operating zones.

Advantageously the recycle stream is cooled and passes at a velocity through the reactor such that the cooling capacity is sufficient for a reactor productivity expressed in pounds (lbs) of polymer per hr/ft$^2$ of reactor cross-sectional area exceeding 500 lb/hr-ft$^2$ (2441 kg/hr-m$^2$), especially 600 lb/hr-ft$^2$ (2929 kg/hr-m$^2$) involving an enthalpy change of the recycle stream from the reactor inlet conditions to the reactor outlet conditions of at least 40 Btu/lb, preferably 50 Btu/lb. Preferably, the liquid and gaseous component of the stream are added in a mixture below a reactor distributor plate. This reactor productivity is equal to the Space time yield multiplied by the height of the fluidized bed.

In the preferred embodiment of the present invention, the liquid introduced into the reactor 10 is vaporized in order to achieve the increased reactor cooling capacity benefits of this polymerization process. High levels of liquid in the bed may promote the formation of agglomerates which cannot be broken up by mechanical forces present in the bed, thus leading potentially to defluidization, bed collapse and reactor shutdown. In addition, the presence of liquids can influence local bed temperatures and affect the capability of the process to produce polymer having consistent properties, since this requires an essentially constant temperature throughout the bed. For these reasons, the amount of liquid introduced into the fluidized bed under a given set of conditions should not materially exceed the amount that will vaporize in the lower region of the fluidized bed, where mechanical forces associated with entry of the recycle stream through the distributor plate are sufficient to break up agglomerates formed by liquid-particle interaction.

It has been discovered in this present invention that, for given composition and physical characteristics of the product particles in the fluidized bed and otherwise given or related reactor and recycle conditions, by defining boundary conditions related to the composition of the gas flowing through the bed, a viable fluidized bed can be maintained at high cooling levels.

While not wishing to bound by any theory, applicants suggest that the observed decrease in fluidized bulk density may reflect an expansion of the dense particulate phase and change in bubble behavior within the fluidized bed.

Referring back to FIG. 1, a catalyst activator, if required depending on the catalyst utilized, is generally added downstream from the heat exchanger 26. The catalyst activator may be introduced from a dispenser 32 into the recycle stream 16. However, the improved process of this present invention is not limited to the location of the insertion of the catalyst activator or any other required components such as catalyst promoters.

The catalyst from the catalyst reservoir can be injected either intermittently or continuously into the fluidized bed reaction zone 12 at a preferred rate at a point 34 which is above the gas distributor plate 18. In the preferred embodiment as described above, the catalyst is injected at a point where mixing with polymer particles within the fluidized bed 12 is best accomplished. Because some catalysts are very active, the preferred injection into the reactor 10 should be above the gas distributor plate 18, not below. Injection of catalyst in the area below the gas distributor plate 18 may result in the polymerization of product in this area, which would result eventually in the plugging of the gas distributor plate 18. Also, introducing the catalyst above the gas distributor plate 18 aids in the uniform distribution of catalyst throughout the fluidized bed 12 and, therefore, helps to preclude the formation of "hot spots" resulting from high local catalyst concentrations. Injection is preferably into the lower portion of the fluidized bed in the reaction zone 12 to provide uniform distribution and to minimize catalyst carryover into the recycle line where polymerization may lead to eventual plugging of the recycle line and heat exchanger.

A variety of techniques for catalyst injection may be utilized in the improved process of this present invention, for example the technique described in U.S. Pat. No. 3,779,712, the disclosure of which is incorporated herein by reference. An inert gas such as nitrogen or an inert liquid that readily volatilizes under reactor conditions is preferably used to carry the catalyst into the fluidized bed reaction zone 12. The catalyst injection rate and monomer concentration in the recycle stream 16 determines the rate of polymer production in the fluidized bed reaction zone 12. It is possible to control the production rate of the polymer produced by simply adjusting catalyst injection rate.

In the preferred operating mode of the reactor 10 utilizing the improved process of this present invention, the height of the fluidized bed in reaction zone 12 is maintained by the withdrawal of a portion of the polymer product at a rate consistent with the formation of the polymer product. Instrumentation for detecting any temperature or pressure changes throughout the reactor 10 and recycle stream 16 are useful to monitor changes in the condition of the fluidized bed in the reaction zone 12. Also, this instrumentation allows for either the manual or automatic adjustment of rate of catalyst injection or the temperature of the recycle stream.

In operation of the reactor 10, the product is removed from the reactor through a discharge system 36. The discharge of polymer product is preferably followed by separating fluids from the polymer product. These fluids may be returned to the recycle stream line 16 as a gas at point 38 and/or as a condensed liquid at point 40. The polymer product is routed to downstream processing at point 42. The discharge of polymer product is not limited to the method shown in FIG. 1, which illustrates just one particular discharge method. Other discharge systems can be employed, for example, those disclosed and claimed in U.S. Pat. Nos. 4,543,399, and 4,588,790 to Jenkins, et al.

In accordance with the present invention, a process is provided for increasing the reactor productivity of polymer production in a fluidized bed reactor employing an exothermic polymerization reaction by cooling the recycle stream to below its dew point and returning the resultant recycle stream to the reactor. The recycle stream containing greater than 20 weight percent liquid can be recycled to the reactor to maintain the fluidized bed at a desired temperature.

In the processes of the invention, the cooling capacity of the recycle stream or fluidizing medium may be significantly increased by both the vaporization of the condensed liquids entrained in the recycle stream and as a result of the greater temperature differential between the entering recycle stream and the fluidized bed temperature. In the preferred embodiment the polymers, homopolymers or copolymers, produced are selected from a film grade material having a MI from 0.01 to 5.0, preferably 0.5 to 5.0 and a density of 0.900 to 0.930; or a molding grade material having a MI of from 0.10 to 150.0, preferably 4.0 to 150.0 and a density of from 0.920 to 0.939; or a high density material having a MI of from 0.01 to 70.0, preferably 2.0 to 70.0 and a density of from 0.940 to 0.970; all density units being in a $g/cm^3$ and the melt index being in g/10 min determined according to ASTM-1238 condition E.

Depending on the target material different recycle conditions may be adopted providing reactor productivity levels not previously envisaged.

Firstly, there may be produced for example a film grade material in which the recycle stream has a butene-/ethylene mole ratio of from 0.001 to 0.60, preferably 0.30 to 0.50 or a 4-methyl-pentene-1/ethylene mole ratio of from 0.001 to 0.50 , preferably 0.08 to 0.33 or a hexene/ethylene mole ratio of from 0.001 to 0.30, preferably 0.05 to 0.20; or an octene-1/ethylene mole ratio of from 0.001 to 0.10, preferably 0.02 to 0.07; a hydrogen/ethylene mole ratio of from 0.00 to 0.4, preferably 0.1 to 0.3; and an isopentane level of from 3 to 20 mol % or an isohexane level of from 1.5 to 10 mol % and in which the cooling capacity of the recycle stream is at least 40 Btu/lb, preferably at least 50 but/lb or the weight percent condensed is at least 15, preferably greater than 20.

Secondly, the process may be used to yield a molding grade material in which the recycle stream has a butene-1/ethylene mole ratio of from 0.001 to 0.60, preferably 0.10 to 0.50 or a 4-methyl-pentene-1/ethylene mole ratio of from 0.001 to 0.50, preferably, 0.08 to 0.20 or a hexene/ethylene mole ratio of from 0.001 to 0.30, preferably 0.05 to 0.12 or an octene-1/ethylene mole ratio of from 0.001 to 0.10, preferably 0.02 to 0.04; a hydrogen-/ethylene mole ratio of from 0.00 to 1.6, preferably 0.3 to 1.4; and an isopentane level of from 3 to 30 mol % or an isohexane level of from 1.5 to 15 mol % and in which the cooling capacity of the recycle stream is at least 40 Btu/lb, preferably at least 50 Btu/lb or the weight percent condensed is at least 15, preferably greater than 20.

Also, high density grades may be made by a process in which the recycle stream has a butene-ethylene mole ratio of 0.001 to 0.30, preferably 0.001 to 0.15 or a 4-methyl-pentene-1/ethylene mole ratio of from 0.001 to 0.25, preferably 0.001 to 0.12 or a hexene/ethylene mole ratio of 0.001 to 0.15, preferably 0.001 to 0.07 or an octene-1/ethylene mole ratio of from 0.001 to 0.05, preferably 0.001 to 0.02; a hydrogen to ethylene mole ratio of 0.00 to 1.5, preferably 0.3 to 1.0; and an isopentane level of from 10 to 40 mol % or an isohexane level of from 5 to 20 mol % and in which the cooling capacity of the recycle stream is at least 60 Btu/lb, preferably greater than 73 Btu/lb, and most preferably greater than at least about 75 Btu/lb or the weight percent condensed is at least 12, preferably greater than 20.

EXAMPLES

In order to provide a better understanding of the present invention including representative advantages and limitations thereof, the following referential examples are offered as related to actual tests performed in the practice of this invention.

Example 1

A fluidized gas phase reactor was operated to produce a copolymer containing ethylene and butene. The catalyst used is a complex of tetrahydrofuran, magnesium chloride and titanium chloride reduced with diethyl aluminum chloride (diethyl aluminum chloride-to-tetrahydrofuran molar ratio of 0.50) and tri-n-hexyl aluminum (tri-n-hexyl aluminum-to-tetrahydrofuran molar ratio of 0.30) impregnated on triethyl aluminum treated silicon dioxide. The activator is triethyl aluminum (TEAL).

Figure 2:
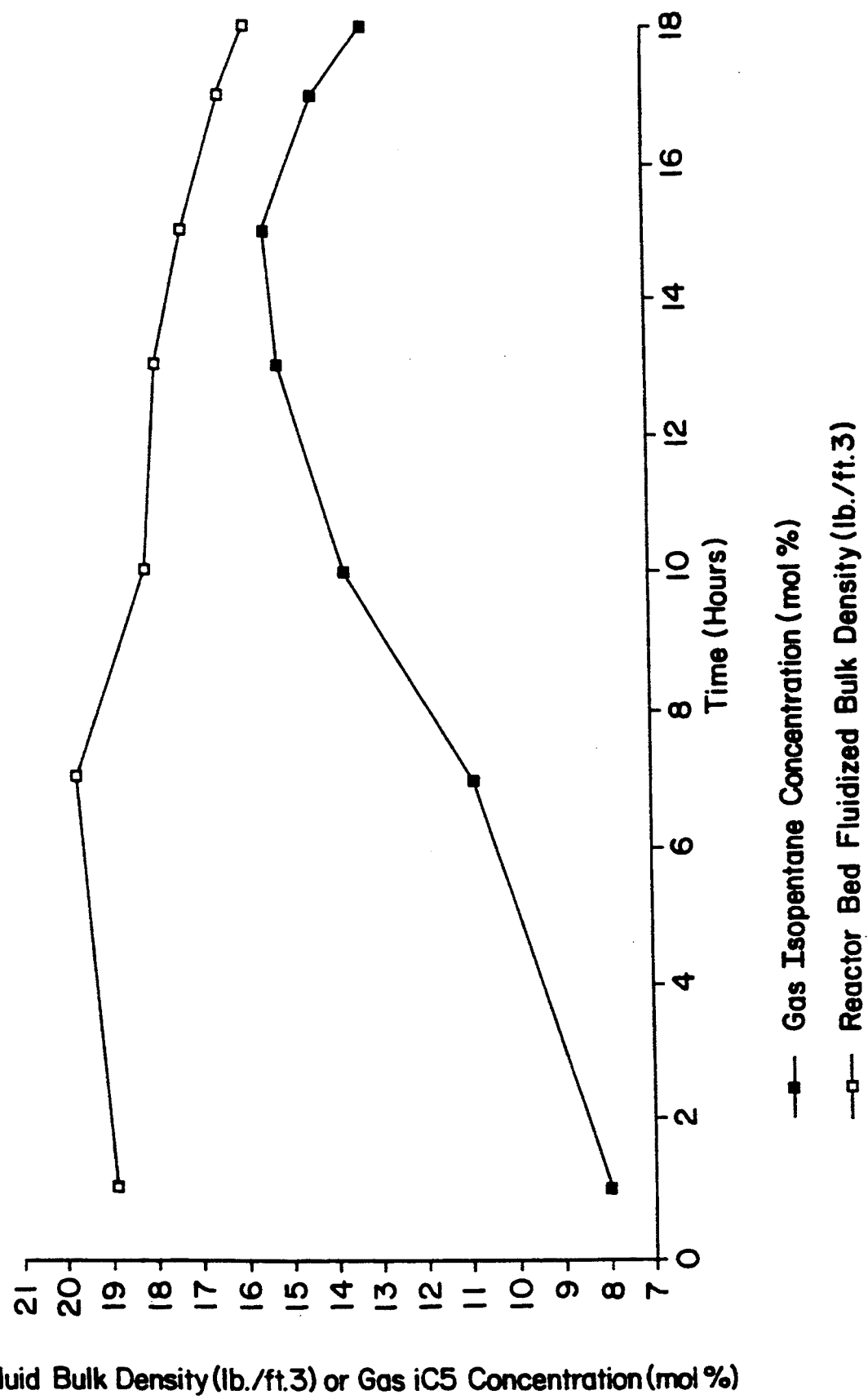
FIG. 2 is a plot of isopentane mole percent and fluidized bulk density of Table 1.

The data in Table 1 and illustrated in FIG. 2 shows the reactor parameters as the isopentane level is gradually increased to achieve the added cooling necessary to obtain higher reactor productivity. This example shows that excessive amounts of isopentane leads to changes in the fluidized bed and ultimately to its disruption in the formation of hot spots and agglomerates necessitating reactor shut-down. As the concentration of isopentane increases the fluidized bulk density decreases indicating a change in the bed fluidization which also resulted in an increase in the bed height. The catalyst rate was decreased to reduce the bed level. In addition, the isopentane concentration was reduced in an attempt to reverse the change in the fluidized bed. However, at this point, although the bed height returned to normal, the disruption accompanied by hot spots and agglomerations in the bed was irreversible and the reactor was shut-down.

Figure 3:
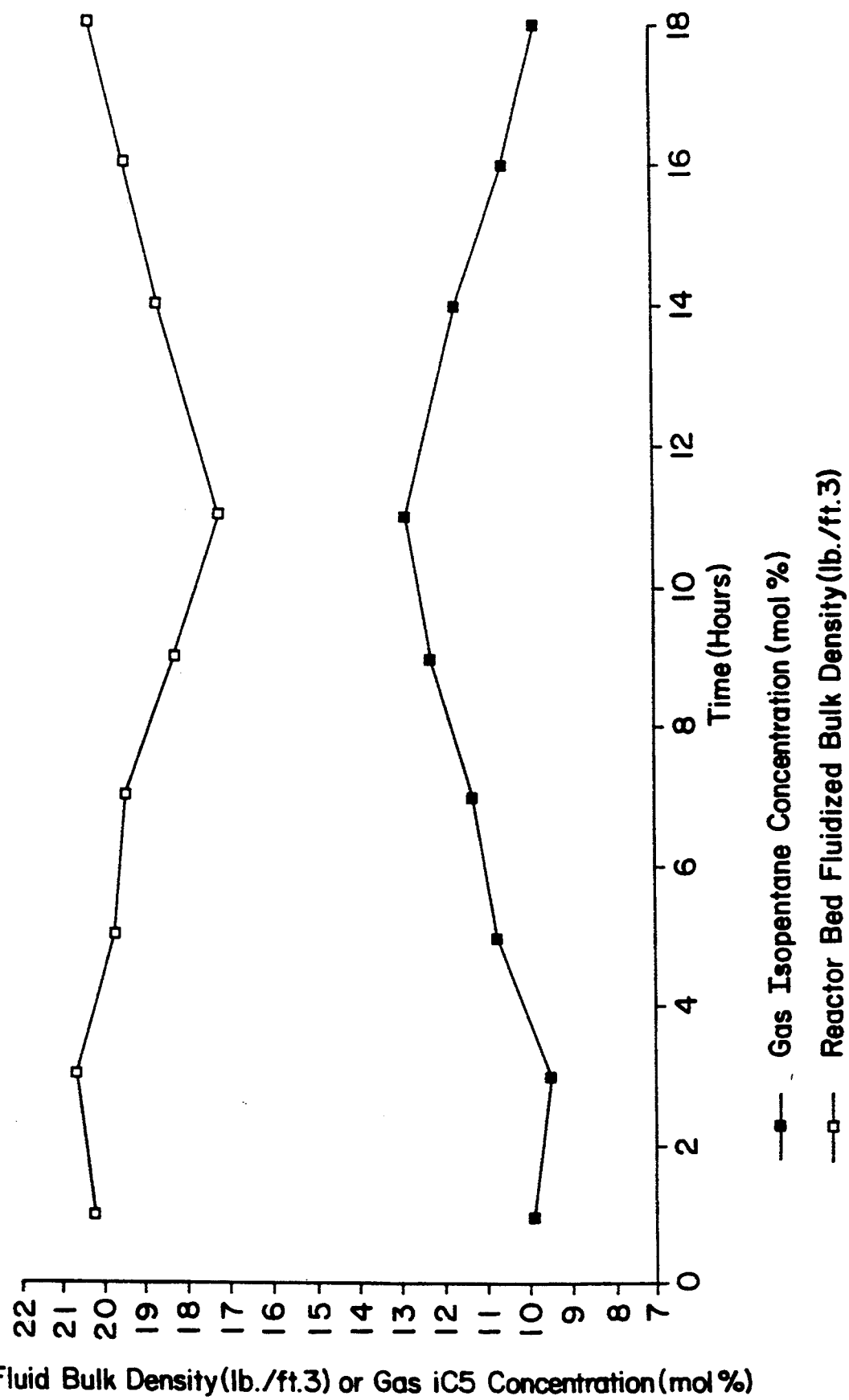
FIG. 3 is a plot of isopentane mole percent and fluidized bulk density of Table 2.

Furthermore, in a second run, Table 2 and FIG. 3 shows that as the concentration of isopentane was gradually increased the fluidized bulk density decreased as expected from Table 1. However, this time the fluidized bulk density gradually increased as a result of reducing the concentration of isopentane. Thus, in this instance, the change in fluidization in the bed was recoverable and reversible.

TABLE 1

| | Time (Hours) | | | | | | |
|---|---|---|---|---|---|---|---|
| | 1 | 7 | 10 | 13 | 15 | 17 | 18 |
| Resin Melt Index (dg/10 min) | 1.01 | 1.04 | 1.03 | 1.12 | 1.09 | 1.11 | 1.11 |
| Resin Density (g/cc) | 0.9176 | 0.9183 | 0.9190 | 0.9190 | 0.9183 | 0.9193 | 0.9193 |
| Recycle Stream Compositions: | | | | | | | |
| Ethylene | 47.4 | 46.0 | 44.7 | 44.1 | 44.0 | 45.9 | 46.3 |
| Butene-1 | 19.0 | 18.1 | 17.3 | 17.0 | 16.9 | 18.5 | 19.5 |
| Hexene-1 | | | | | | | |
| Hydrogen | 9.5 | 9.4 | 9.3 | 9.3 | 8.9 | 8.7 | 8.9 |
| Isopentane | 8.0 | 10.8 | 13.7 | 15.1 | 15.4 | 14.3 | 13.2 |
| $C_6$ Saturated Hydrocarbons | | | | | | | |
| Nitrogen | 14.3 | 13.9 | 13.3 | 12.8 | 13.2 | 11.2 | 10.7 |
| Ethane | 1.8 | 1.8 | 1.7 | 1.7 | 1.6 | 1.4 | 1.4 |
| Methane | | | | | | | |
| $C_8$ Saturated Hydrocarbons | | | | | | | |
| Recycle Gas Dew Point (°F.) | 142.9 | 153.5 | 163.8 | 168.3 | 170.1 | 168.8 | 165.0 |
| Recycle Gas Dew Point (°C.) | 61.6 | 67.5 | 73.2 | 75.7 | 76.7 | 76.0 | 73.9 |
| Reactor Inlet Temperature (°F.) | 126.2 | 135.6 | 143.5 | 144.0 | 149.0 | 150.2 | 146.3 |
| Reactor Inlet Temperature (°C.) | 52.3 | 57.6 | 61.9 | 62.2 | 65.0 | 65.7 | 63.5 |
| Liquid in Recycle gas (wt %) | 11.4 | 12.1 | 14.3 | 17.4 | 14.5 | 11.6 | 12.3 |
| Reactor Temperature (°F.) | 182.4 | 182.1 | 182.7 | 182.8 | 183.1 | 184.8 | 185.2 |
| Reactor Temperature (°C.) | 83.6 | 83.4 | 83.7 | 83.8 | 83.9 | 84.9 | 85.1 |
| Reactor Pressure (psig) | 311.9 | 311.5 | 314.2 | 313.4 | 314.7 | 313.5 | 312.6 |
| Reactor Pressure (kPag) | 2150.5 | 2147.7 | 2166.3 | 2160.8 | 2169.8 | 2161.5 | 2155.3 |
| Reactor Superficial Gas Velocity (Ft/sec) | 2.29 | 2.30 | 2.16 | 2.10 | 1.92 | 2.00 | 2.11 |
| Reactor Superficial Gas Velocity (m/sec) | 0.70 | 0.70 | 0.66 | 0.64 | 0.59 | 0.61 | 0.64 |
| Reactor Bed Height (ft) | 43.4 | 43.3 | 43.5 | 49.3 | 51.3 | 45.8 | 45.4 |
| Reactor Bed Height (m) | 13.2 | 13.2 | 13.3 | 15.0 | 15.6 | 14.0 | 13.8 |
| Resin Settled Bulk Density (lb/ft$^3$) | 30.1 | 30.2 | 30.2 | 30.2 | 30.0 | 29.9 | 29.9 |
| Resin Settled Bulk Density (kg/m$^3$) | 482.2 | 483.8 | 483.8 | 483.8 | 480.6 | 479.0 | 479.0 |
| Reactor Bed Fluidized Bulk Density (lb/ft$^3$) | 18.9 | 19.6 | 18.1 | 17.8 | 17.2 | 16.4 | 15.8 |
| Reactor Bed Fluidized Bulk Density (kg/m$^3$) | 302.8 | 314.0 | 290.0 | 285.2 | 275.5 | 262.7 | 253.1 |
| Ratio of Fluidized Bulk Density to Settled Bulk Density | 0.63 | 0.65 | 0.60 | 0.59 | 0.57 | 0.55 | 0.53 |
| Space Time Yield (lb/hr-ft$^3$) | 9.6 | 9.5 | 9.3 | 8.5 | 6.6 | 7.1 | 7.3 |
| Space Time Yield (kg/hr-m$^3$) | 153.0 | 151.8 | 149.3 | 136.0 | 106.0 | 113.8 | 117.2 |
| Production Rate (klb/hr) | 68.5 | 67.8 | 67.0 | 69.2 | 56.1 | 53.8 | 54.9 |
| Production Rate (Tons/hr) | 31.1 | 30.7 | 30.4 | 31.4 | 25.4 | 24.4 | 24.9 |
| Reactor Productivity (lb/hr-ft$^2$) | 415 | 411 | 406 | 419 | 340 | 326 | 332 |
| Reactor Productivity (kg/hr-m$^2$) | 2026 | 2006 | 1982 | 2045 | 1660 | 1591 | 1621 |
| Recycle Stream Enthalpy Change (Btu/lb) | 42 | 40 | 40 | 42 | 37 | 34 | 33 |
| Recycle Stream Enthalpy Change (cal/g) | 23 | 22 | 22 | 23 | 21 | 19 | 18 |

TABLE 2

| | Time (Hours) | | | | | | | | |
|---|---|---|---|---|---|---|---|---|---|
| | 1 | 3 | 5 | 7 | 9 | 11 | 14 | 16 | 18 |
| Resin Melt Index (dg/10 min) | 0.92 | 0.99 | 1.08 | 1.02 | 1.05 | 1.09 | 1.11 | 1.05 | 0.98 |
| Resin Density (g/cc) | 0.9187 | 0.9184 | 0.9183 | 0.9181 | 0.9178 | 0.9177 | 0.9186 | 0.9184 | 0.9183 |
| Recycle Stream Compositions: | | | | | | | | | |
| Ethylene | 52.6 | 53.2 | 52.6 | 52.0 | 52.1 | 51.6 | 52.9 | 52.8 | 52.8 |

TABLE 2-continued

|  | Time (Hours) | | | | | | | | |
| --- | --- | --- | --- | --- | --- | --- | --- | --- | --- |
|  | 1 | 3 | 5 | 7 | 9 | 11 | 14 | 16 | 18 |
| Butene-1 | 20.0 | 19.8 | 19.7 | 20.4 | 19.7 | 19.8 | 19.1 | 20.1 | 20.1 |
| Hexene-1 | | | | | | | | | |
| Hydrogen | 9.7 | 10.2 | 10.3 | 9.9 | 9.9 | 9.9 | 10.4 | 10.0 | 9.6 |
| Isopentane | 9.9 | 9.5 | 10.7 | 11.2 | 12.2 | 12.8 | 11.5 | 10.4 | 9.6 |
| $C_6$ Saturated Hydrocarbons | | | | | | | | | |
| Nitrogen | 8.7 | 8.0 | 7.3 | 6.7 | 6.3 | 6.0 | 6.5 | 7.3 | 8.1 |
| Ethane | 1.2 | 1.2 | 1.1 | 1.1 | 1.1 | 1.1 | 1.2 | 1.2 | 1.3 |
| Methane | | | | | | | | | |
| $C_8$ Saturated Hydrocarbons | | | | | | | | | |
| Recycle Gas Dew Point (°F.) | 154.1 | 152.5 | 156.9 | 160.0 | 161.9 | 165.0 | 159.4 | 155.9 | 153.3 |
| Recycle Gas Dew Point (°C.) | 67.8 | 66.9 | 69.4 | 71.1 | 72.2 | 73.9 | 70.8 | 68.8 | 67.4 |
| Reactor Inlet Temperature (°F.) | 124.2 | 118.3 | 119.7 | 125.3 | 127.3 | 133.2 | 128.0 | 126.2 | 123.0 |
| Reactor Inlet Temperature (°C.) | 51.2 | 47.9 | 48.7 | 51.8 | 52.9 | 56.2 | 53.3 | 52.3 | 50.6 |
| Liquid in Recycle gas (wt %) | 22.2 | 24.9 | 27.4 | 26.4 | 27.0 | 24.3 | 23.2 | 22.1 | 22.2 |
| Reactor Temperature (°F.) | 184.6 | 185.2 | 184.1 | 183.4 | 183.5 | 183.3 | 182.8 | 181.9 | 181.8 |
| Reactor Temperature (°C.) | 84.8 | 85.1 | 84.5 | 84.1 | 84.2 | 84.0 | 83.8 | 83.3 | 83.2 |
| Reactor Pressure (psig) | 314.7 | 315.2 | 315.2 | 315.1 | 315.3 | 314.8 | 312.9 | 312.9 | 313.4 |
| Reactor Pressure (kPag) | 2170.0 | 2173.3 | 2173.3 | 2172.5 | 2174.2 | 2170.7 | 2157.6 | 2157.7 | 2160.6 |
| Reactor Superficial Gas Velocity (Ft/sec) | 1.73 | 1.74 | 1.75 | 1.76 | 1.77 | 1.76 | 1.75 | 1.74 | 1.74 |
| Reactor Superficial Gas Velocity (m/sec) | 0.53 | 0.53 | 0.53 | 0.54 | 0.54 | 0.54 | 0.53 | 0.53 | 0.53 |
| Reactor Bed Height (ft) | 44.7 | 45.0 | 44.6 | 44.9 | 46.0 | 47.0 | 45.5 | 45.6 | 45.2 |
| Reactor Bed Height (m) | 13.6 | 13.7 | 13.6 | 13.7 | 14.0 | 14.3 | 13.9 | 13.9 | 13.8 |
| Resin Settled Bulk Density (lb/ft$^3$) | 29.9 | 29.9 | 29.7 | 28.8 | 29.0 | 29.1 | 29.3 | 29.4 | 29.4 |
| Resin Settled Bulk Density (kg/m$^3$) | 479.0 | 479.0 | 475.8 | 461.4 | 464.6 | 465.4 | 468.6 | 471.3 | 471.8 |
| Reactor Bed Fluidized Bulk Density (lb/ft$^3$) | 20.2 | 20.7 | 19.6 | 19.3 | 18.2 | 17.1 | 18.5 | 19.2 | 20.0 |
| Reactor Bed Fluidized Bulk Density (kg/m$^3$) | 323.9 | 330.9 | 314.4 | 309.9 | 291.1 | 274.3 | 296.2 | 308.1 | 321.1 |
| Ratio of Fluidized Bulk Density to Settled Bulk Density | .68 | .69 | .66 | .67 | .63 | .59 | .63 | .65 | .68 |
| Space Time Yield (lb/hr-ft$^3$) | 9.7 | 10.3 | 11.1 | 11.1 | 11.1 | 9.9 | 9.3 | 9.1 | 9.2 |
| Space Time Yield (kg/hr-m$^3$) | 154.9 | 165.1 | 178.1 | 178.0 | 177.0 | 158.4 | 149.1 | 144.9 | 147.3 |
| Production Rate (klb/hr) | 71.3 | 76.6 | 82.2 | 82.3 | 84.0 | 76.8 | 69.9 | 68.0 | 68.5 |
| Production Rate (Tons/hr) | 32.3 | 34.7 | 37.3 | 37.3 | 38.1 | 34.8 | 31.7 | 30.8 | 31.1 |
| Reactor Productivity (lb/hr-ft$^2$) | 432 | 464 | 498 | 498 | 509 | 465 | 423 | 412 | 415 |
| Reactor Productivity (kg/hr-m$^2$) | 2109 | 2265 | 2431 | 2431 | 2485 | 2270 | 2065 | 2011 | 2026 |
| Recycle Stream Enthalpy Change (Btu/lb) | 54 | 59 | 61 | 60 | 61 | 55 | 52 | 51 | 52 |
| Recycle Stream Enthalpy Change (cal/g) | 30 | 33 | 34 | 33 | 34 | 31 | 29 | 28 | 29 |

Figure 4A:
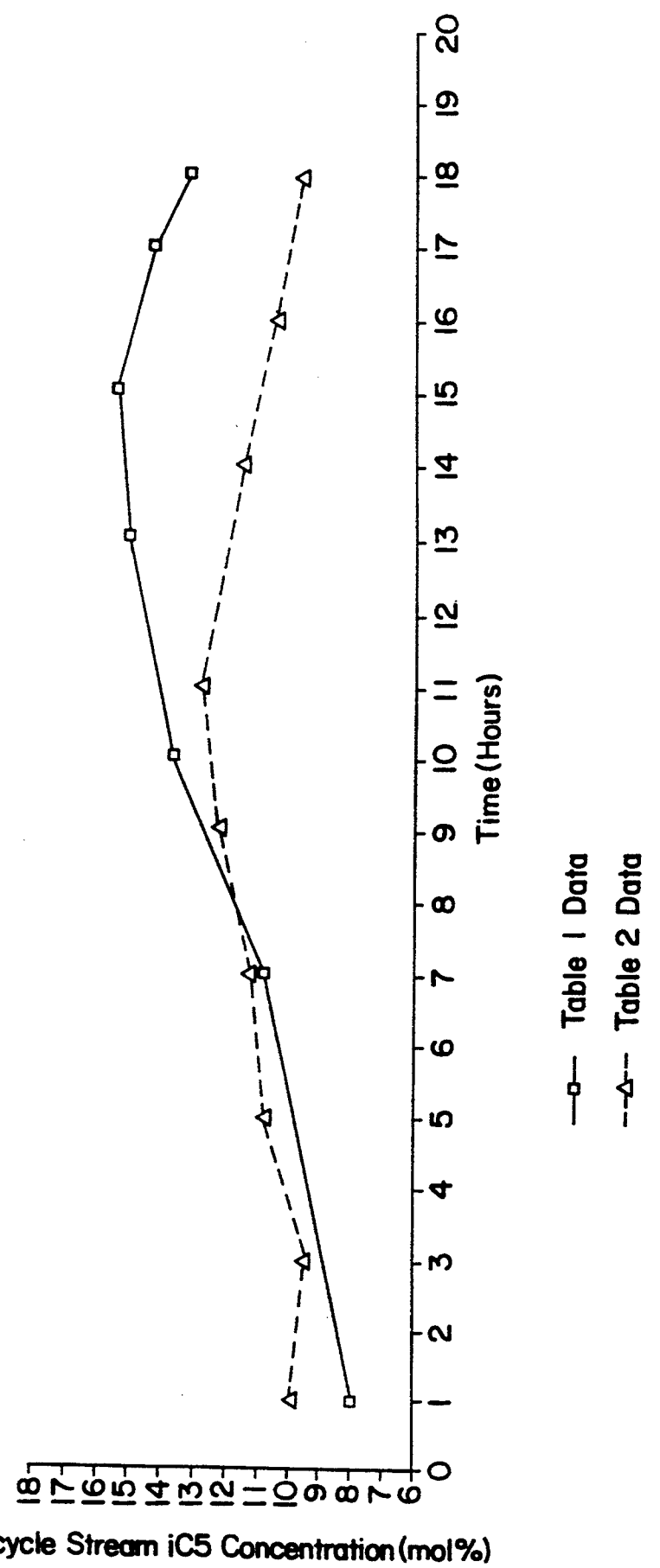
FIG. 4 is a plot comparing FIG. 2 and FIG. 3.
Figure 4B:
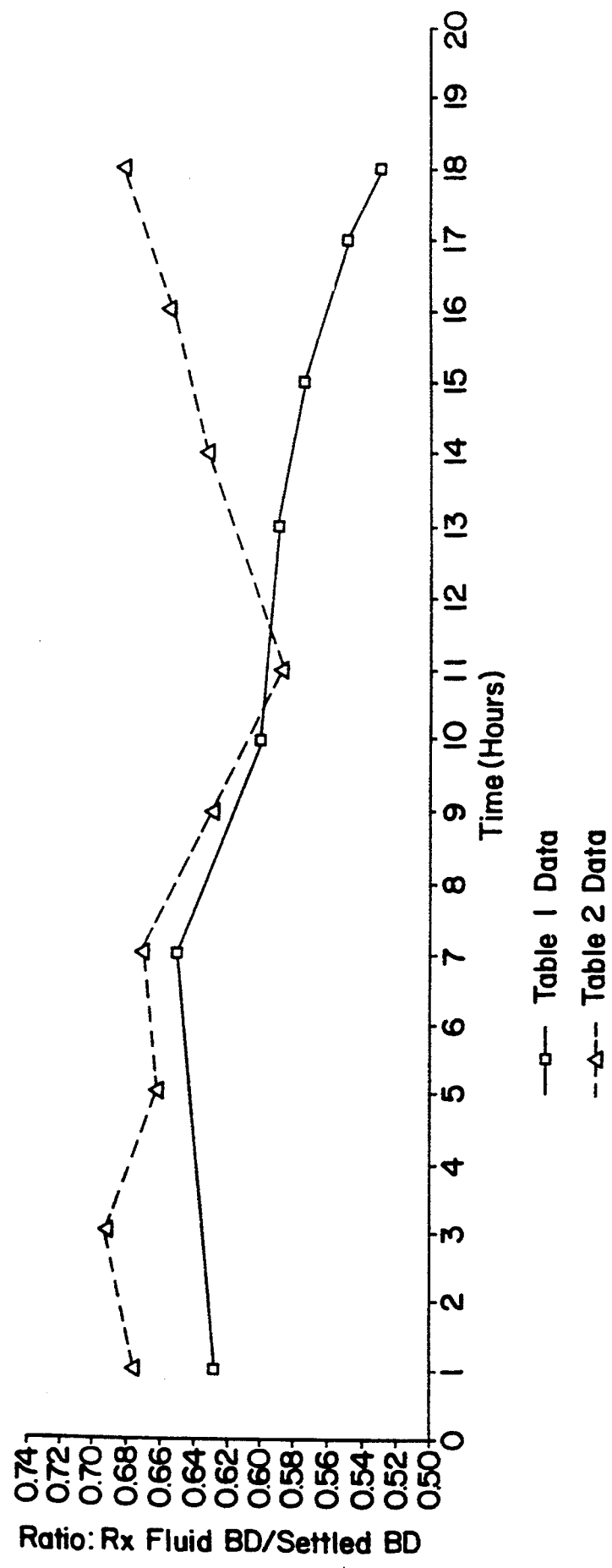

Therefore, FIG. 4, a representation of the results of both FIGS. 1 and 2, clearly illustrates a point at which changes in bed fluidization are not reversible because of the excessive use of a condensable fluid. This point is defined to be where the ratio of the reactor bed fluidized bulk density to the settled bulk density is less than 0.59. Example 1 clearly demonstrates, in contrast to the disclosure in Jenkins, et al., that there is a limit for condensable materials useful to optimize the space time yield or reactor productivity of a reactor operating in condensed mode.

Example 2

The following examples were carried out in essentially the same way as Example 1 utilizing the same type of catalyst and activator to produce homopolymers and ethylene/butene copolymers of various density and melt index ranges.

TABLE 3

|  | Run | | | | |
| --- | --- | --- | --- | --- | --- |
|  | 1 | 2 | 3 | 4 | 5 |
| Resin Melt Index (dg/10 min) | 0.86 | 6.74 | 7.89 | 22.22 | 1.91 |
| Resin Density (g/cc) | 0.9177 | 0.9532 | 0.9664 | 0.9240 | 0.9186 |
| Recycle Stream Compositions: | | | | | |
| Ethylene | 53.1 | 40.5 | 49.7 | 34.1 | 44.0 |
| Butene-1 | 20.2 | | | 14.9 | 18.2 |
| Hexene-1 | | 0.6 | | | |
| Hydrogen | 8.9 | 17.7 | 26.5 | 25.0 | 11.9 |
| Isopentane | 9.7 | 3.7 | 0.7 | 14.1 | 9.6 |
| $C_6$ Saturated Hydrocarbons | | 7.0 | 10.2 | | |
| Nitrogen | 8.7 | 19.2 | 8.8 | 9.4 | 14.9 |
| Ethane | 1.7 | 9.4 | 4.0 | 2.5 | 3.3 |
| Methane | | 1.1 | 0.3 | | |
| $C_8$ Saturated Hydrocarbons | | 0.4 | 0.5 | | |
| Recycle Gas Dew Point (°F.) | 154.0 | 172.6 | 181.6 | 162.1 | 148.5 |
| Recycle Gas Dew Point (°C.) | 67.8 | 78.1 | 83.1 | 72.3 | 64.7 |
| Reactor Inlet Temperature (°F.) | 115.2 | 107.8 | 117.7 | 135.0 | 114.2 |
| Reactor Inlet Temperature (°C.) | 46.2 | 42.1 | 47.6 | 57.2 | 45.7 |
| Liquid in Recycle gas (wt %) | 28.6 | 25.4 | 27.6 | 21.8 | 24.4 |
| Reactor Temperature (°F.) | 183.3 | 208.4 | 209.3 | 178.0 | 183.7 |

TABLE 3-continued

| | Run | | | | |
|---|---|---|---|---|---|
| | 1 | 2 | 3 | 4 | 5 |
| Reactor Temperature (°C.) | 84.1 | 98.0 | 98.5 | 81.1 | 84.3 |
| Reactor Pressure (psig) | 315.7 | 300.2 | 299.8 | 314.7 | 314.3 |
| Reactor Pressure (kPag) | 2176.7 | 2069.7 | 2066.8 | 2169.8 | 2167.2 |
| Reactor Superficial Gas Velocity (Ft/sec) | 1.69 | 2.76 | 2.36 | 1.74 | 1.73 |
| Reactor Superficial Gas Velocity (m/sec) | 0.52 | 0.84 | 0.72 | 0.53 | 0.53 |
| Reactor Bed Height (ft) | 47.2 | 43.0 | 42.0 | 44.3 | 45.6 |
| Reactor Bed Height (m) | 14.4 | 13.1 | 12.8 | 13.5 | 13.9 |
| Resin Settled Bulk Density (lb/ft$^3$) | 28.3 | 23.2 | 29.0 | 24.5 | 29.3 |
| Resin Settled Bulk Density (kg/m$^3$)) | 453.4 | 371.0 | 464.0 | 392.5 | 468.6 |
| Reactor Bed Fluidized Bulk Density (lb/ft$^3$) | 19.6 | 16.7 | 21.7 | 15.7 | 19.1 |
| Reactor Bed Fluidized Bulk Density (kg/m$^3$) | 314.0 | 267.9 | 347.4 | 251.5 | 305.7 |
| Ratio of Fluidized Bulk Density to Settled Bulk Density | 0.69 | 0.72 | 0.75 | 0.64 | 0.65 |
| Space Time Yield (lb/hr-ft$^3$) | 10.8 | 14.3 | 13.0 | 7.7 | 9.8 |
| Space Time Yield (kg/hr-m$^3$) | 172.8 | 228.8 | 208.0 | 123.2 | 157.2 |
| Production Rate (klb/hr) | 83.7 | 101.2 | 90.2 | 56.6 | 73.7 |
| Production Rate (Tons/hr) | 38.0 | 45.9 | 40.9 | 25.7 | 33.4 |
| Reactor Productivity (lb/hr-ft$^2$) | 507 | 613 | 546 | 343 | 446 |
| Reactor Productivity (kg/hr-m$^2$) | 2475 | 2992 | 2665 | 1674 | 2177 |
| Recycle Stream Enthalpy Change (Btu/lb) | 65 | 67 | 75 | 49 | 60 |
| Recycle Stream Enthalpy Change (cal/g) | 36 | 37 | 42 | 27 | 33 |

These runs demonstrate the advantages of achieving higher reactor productivity at levels of condensed liquid exceeding 20 weight percent while maintaining the ratio of fluidized bulk density to settled bulk density of at least 0.59.

Because of the downstream handling processes, for example, product discharge systems, extruders and the like, certain reactor conditions had to be manipulated in order not to exceed the overall plant capacity. Therefore, the full advantages of this invention cannot be fully appreciated by the Examples shown in Table 3.

For instance, in run 1 of Table 3, the superficial gas velocity was kept low at around 1.69 ft/sec and therefore, the space-time-yield reflected is much less than would otherwise be the case. If the velocity was maintained at around 2.4 ft/sec the estimated space-time-yield would be in the excess of 15.3 lb/hr-ft$^3$ would be achievable. Runs 2 and 3 of Table 3 show the effect of operating a reactor at a high superficial gas velocity and a weight percent condensed well above 20%. The space-time-yields achieved were around 14.3 and 13.0 lb/hr-ft$^3$ demonstrating a significant increase in production rate. Such high STY or production rates are not taught or suggested by Jenkins, et al. Similar to run 1, run 4 of Table 3 shows a superficial gas velocity of 1.74 ft/sec at 21.8 weight percent condensed liquid. If the velocity in run 4 is increased to 3.0 ft/sec the achievable STY would increase from 7.7 to 13.3 lb/hr-ft$^3$. If the velocity in run 5 is increased to 3.0 ft/sec the achievable space-time-yield would increase from 9.8 to 17.0 lb/hr-ft$^3$. For all runs 1-5 the ratio of the fluidized bulk density to settled bulk density was maintained above at least 0.59.

Example 3

The data shown for the cases in paper Example 3, Table 4, were prepared by extrapolating information from actual operations by using thermodynamic equations well known in the art to project target conditions. This data in Table 4 illustrates the advantages of this invention if limitations of auxiliary reactor equipment is removed.

TABLE 4

| | RUN 1 | | | | RUN 2 | | | |
|---|---|---|---|---|---|---|---|---|
| Case | 1 | 2 | 3 | 4 | 1 | 2 | 3 | 4 |
| Resin Melt Index (dg/10 min) | 0.86 | | | | 6.74 | | | |
| Resin Density (g/cc) | 0.9177 | | | | 0.9532 | | | |
| Recycle Stream Compositions: | | | | | | | | |
| Ethylene | 53.1 | 53.1 | 53.1 | 53.1 | 40.5 | 40.5 | 40.5 | 40.5 |
| Butene-1 | 20.2 | 20.2 | 20.2 | 20.2 | | | | |
| Hexene-1 | | | | | 0.6 | 0.6 | 0.6 | 0.6 |
| Hydrogen | 8.9 | 8.9 | 8.9 | 8.9 | 17.7 | 17.7 | 17.7 | 17.7 |
| Isopentane | 9.7 | 9.7 | 9.7 | 13.0 | 3.7 | 3.7 | 3.7 | 3.7 |
| C$_6$ Saturated Hydrocarbons | | | | | 7.0 | 7.0 | 10.0 | 10.0 |
| Nitrogen | 8.7 | 8.7 | 8.7 | 5.9 | 19.2 | 19.2 | 17.2 | 17.2 |
| Ethane | 1.7 | 1.7 | 1.7 | 1.2 | 9.4 | 9.4 | 8.5 | 8.5 |
| Methane | | | | | 1.1 | 1.1 | 1.0 | 1.0 |
| C$_8$ Saturated Hydrocarbons | | | | | 0.4 | 0.4 | 0.4 | 0.4 |
| Recycle Gas Dew Point (°F.) | 154.0 | 154.0 | 154.0 | 167.9 | 172.6 | 172.6 | 188.3 | 188.3 |
| Recycle Gas Dew Point (°C.) | 67.8 | 67.8 | 67.8 | 75.5 | 78.1 | 78.1 | 86.8 | 86.8 |
| Reactor Inlet Temperature (°F.) | 115.2 | 115.2 | 105.0 | 105.0 | 107.8 | 100.0 | 100.0 | 85.0 |
| Reactor Inlet Temperature (°C.) | 46.2 | 46.2 | 40.6 | 40.6 | 42.1 | 37.8 | 37.8 | 29.4 |
| Liquid in Recycle gas (wt %) | 28.6 | 28.6 | 34.4 | 44.2 | 25.4 | 27.1 | 35.9 | 38.6 |
| Reactor Temperature (°F.) | 183.3 | 183.3 | 183.3 | 183.3 | 208.4 | 208.4 | 208.4 | 208.4 |
| Reactor Temperature (°C.) | 84.1 | 84.1 | 84.1 | 84.1 | 98.0 | 98.0 | 98.0 | 98.0 |
| Reactor Pressure (psig) | 315.7 | 315.7 | 315.7 | 315.7 | 300.2 | 300.2 | 300.2 | 300.2 |
| Reactor Pressure (kPag) | 2176.7 | 2176.7 | 2176.7 | 2176.7 | 2069.7 | 2069.7 | 2069.7 | 2069.7 |
| Reactor Superficial Gas Velocity (Ft/sec) | 1.69 | 2.40 | 2.40 | 2.40 | 2.76 | 2.76 | 2.76 | 2.76 |
| Reactor Superficial Gas Velocity (m/sec) | 0.52 | 0.73 | 0.73 | 0.73 | 0.84 | 0.84 | 0.84 | 0.84 |
| Reactor Bed Height (ft) | 47.2 | 47.2 | 47.2 | 47.2 | 43.0 | 43.0 | 43.0 | 43.0 |

TABLE 4-continued

| Case | RUN 1 | | | | RUN 2 | | | |
|---|---|---|---|---|---|---|---|---|
| | 1 | 2 | 3 | 4 | 1 | 2 | 3 | 4 |
| Reactor Bed Height (m) | 14.4 | 14.4 | 14.4 | 14.4 | 13.1 | 13.1 | 13.1 | 13.1 |
| Space Time Yield (lb/hr-ft$^3$) | 10.8 | 15.3 | 18.1 | 23.3 | 14.3 | 15.6 | 17.8 | 19.8 |
| Space Time Yield (kg/hr-m$^3$) | 172.8 | 245.4 | 290.3 | 372.2 | 228.8 | 249.9 | 284.4 | 317.6 |
| Production Rate (klb/hr) | 83.7 | 118.9 | 140.6 | 180.3 | 101.2 | 110.5 | 125.8 | 140.5 |
| Production Rate (Tons/hr) | 38.0 | 53.9 | 63.8 | 81.7 | 45.9 | 50.1 | 57.0 | 63.7 |
| Reactor Productivity (lb/hr-ft$^2$) | 507 | 720 | 851 | 1092 | 613 | 669 | 762 | 851 |
| Reactor Productivity (kg/hr-m$^2$) | 2475 | 3515 | 4154 | 5331 | 2992 | 3266 | 3720 | 4154 |
| Recycle Stream Enthalpy Change (Btu/lb) | 67 | 67 | 77 | 95 | 69 | 76 | 81 | 90 |
| Recycle Stream Enthalpy Change (cal/G) | 37 | 37 | 43 | 53 | 38 | 42 | 45 | 50 |

In run 1, the superficial gas velocity is increasing from 1.69 ft/sec to 2.40 ft/sec which results in a higher STY of 15.3 lb/hr-ft$^3$ as compared to the initial 10.8 lb/hr-ft$^3$. In a further step, the recycle inlet stream is cooled to 40.6° C. from 46.2° C. This cooling increases the recycle condensed level to 34.4 wt. % and allows additional improvement in STY to 18.1. In the last step, the gas composition is changed by increasing the concentration of the condensable inert, isopentane, thereby improving the cooling capability. Through this means, the recycle condensed level further increases to 44.2 wt. % and the STY reaches 23.3. Overall, the incremental steps provide a 116% increase in production capacity from the reactor system.

In run 2, the recycle inlet temperature is cooled to 37.8° C. from 42.1° C. This cooling increases the recycle condensed from 25.4 wt. % to 27.1 wt. % and an increase in STY from 14.3 to 15.6 lb/hr-ft$^3$. In a further step, the concentration of C6 hydrocarbons is increased from 7 mol % to 10 mol %. This improvement in cooling capability allows an increase in STY to 17.8 lb/hr-ft$^2$. As a final step to demonstrate the value of this improvement, the recycle inlet temperature is again decreased to 29.4° C. This additional cooling allows an STY of 19.8 lb/hr-ft$^3$ as the condensed level of the recycle stream reaches 38.6 wt. %. Overall, the incremental steps provide a 39% increase in production capacity from the reactor system.

While the present invention has been described and illustrated by reference to particular embodiments thereof, it will be appreciated by those of ordinary skill in the art that the invention lends itself to variations not necessarily illustrated herein. For example, it is not beyond the scope of this invention to utilize a catalyst of increased activity to increase the rate of production or reduce the temperature of a recycle stream by employing refrigerator units. For this reason, then, references should be made solely to the appended claims for purposes of determining the true scope of the present invention.

We claim:

1. A process for polymerizing alpha-olefin(s) in a gas phase reactor having a fluidized bed and a fluidizing medium wherein the fluidizing medium serves to control the cooling capacity of said reactor, the improvement comprising employing a level of liquid in the fluidizing medium entering the reactor which is in the range of from 17.4 to 50 weight percent based on the total weight of the fluidizing medium and maintaining the ratio of fluidized bulk density to settled bulk density above 0.59.

2. The process in accordance with claim 1 wherein the level of liquid is within the range of from 22 to 50 weight percent based on the total weight of the fluidizing medium.

3. The process in accordance with claim 1 wherein the level of liquid is within the range of from 25 to 50 weight percent liquid based on the total weight of the fluidizing medium 4. The process in accordance with claim 1 wherein the level of liquid in the fluidizing medium based on the total weight of the fluidizing medium is in the range of from 30 to 50 weight percent.

5. The process in accordance with claim 1 wherein polymer product is withdrawn at a rate greater than about 500 lb/hr-ft$^2$.

6. The process in accordance with claim 1 wherein said fluidizing medium comprises:
  i) butene-1 and ethylene at a molar ratio of from about 0.001 to about 0.60 or 4-methyl-pentene-1 and ethylene at a molar ratio of from about 0.001 to about 0.50 or hexene-1 and ethylene at a molar ratio of from about 0.001 to about 0.30 or octene-1 and ethylene at a molar ratio of from about 0.001 to about 0.10;
  ii) a condensable inert fluid comprising from about 1.5 to about 20 mole percent of the fluidizing medium.

7. The process in accordance with claim 6 wherein hydrogen is present at a molar ratio with respect to ethylene of from about 0.00 to about 0.40.

8. The process in accordance with claim 6 wherein the condensable inert fluid is isopentane.

9. The process in accordance with claim 8 wherein the concentration of isopentane in said fluidizing medium is about 3 to about 20 mole percent.

10. The process in accordance with claim 6 wherein the condensable inert fluid is isohexane.

11. The process in accordance with claim 10 wherein the concentration of isohexane in said fluidizing medium is about 1.5 to about 10 mole percent.

12. The process in accordance with claim 1 wherein said fluidizing medium comprises:
  i) butene-1 and ethylene at a molar ratio of from about 0.001 to about 0.60 or 4-methyl-pentene-1 and ethylene at a molar ratio of from about 0.001 to about 0.50 or hexene-1 and ethylene at a molar ratio of from about 0.001 to about 0.30 or octene-1 and ethylene at a molar ratio of from about 0.001 to about 0.10;
  ii) a condensable inert fluid comprising from about 1.5 to about 30 mole percent of the fluidizing medium.

13. The process in accordance with claim 12 wherein hydrogen is present at a molar ratio with respect to ethylene of from about 0.00 to about 1.6.

14. The process in accordance with claim 12 wherein the condensable inert fluid is isopentane.

15. The process in accordance with claim 14 wherein the concentration of isopentane in said fluidizing medium is about 3 to about 30 mole percent.

16. The process in accordance with claim 12 wherein the condensable inert fluid is isohexane.

17. The process in accordance with claim 16 wherein the concentration of isohexane in said fluidizing medium is about 1.5 to about 15 mole percent.

18. The process in accordance with claim 1 wherein said fluidizing medium comprises:
   i) butene-1 and ethylene at a molar ratio of from about 0.001 to about 0.30 or 4-methyl-pentene-1 and ethylene at a molar ratio of from about 0.001 to about 0.25 or hexene-1 and ethylene at a molar ratio of from about 0.001 to about 0.15 or octene-1 and ethylene at a molar ratio of from about 0.001 to about 0.05;
   ii) a condensable inert fluid comprising from about 5 to about 40 mole percent of the fluidizing medium.

19. The process in accordance with claim 18 wherein hydrogen is present at a molar ratio with respect to ethylene of from about 0.00 to 1.5.

20. The process in accordance with claim 18 wherein the condensable inert fluid is isopentane.

21. The process in accordance with claim 20 wherein the concentration of isopentane in said fluidizing medium is about 3 to about 20 mole percent.

22. The process in accordance with claim 18 wherein the condensable inert fluid is isohexane.

23. The process in accordance with claim 22 wherein the concentration of isohexane in said fluidizing medium is about 1.5 to about 15 mole percent.

24. A process for polymerizing alphaoolefin(s) in a gas phase reactor having a fluidized bed and a fluidizing medium for producing film and molding grade products, the improvement comprising operating said reactor such that the enthalpy change of said fluidizing medium entering and exiting the reactor is in the range of from 42 Btu/lb to 110 Btu/lb and maintaining the ratio of fluidized bulk density to settled bulk density above 0.59.

25. The process in accordance with claim 24 wherein the fluidizing medium comprises a gas phase and a liquid phase wherein the level of liquid entering the reactor is in the range of from 20 to 50 weight percent based on the total weight of the fluidizing medium.

26. The process in accordance with claim 24 wherein the enthalpy change is in the range of between about 50 Btu/lb to about 100 Btu/lb.

27. The process in accordance with claim 24 wherein the product is withdrawn at a rate above about 500 lb/hr-ft$^2$.

28. A continuous process for increasing reactor productivity of a gas phase polymerization reactor having a fluidizing medium and a fluidized bed, said process comprising passing a gaseous stream comprising monomer through a reaction zone in the presence of a catalyst to produce a polymeric product, withdrawing said polymeric product, withdrawing said fluidizing medium comprising unreacted monomer from said reaction zone, mixing said fluidizing medium with hydrocarbon and polymerizable monomer(s) to form a liquid phase and a gas phase, and recycling said fluidizing medium to said reactor, the improvement comprising:
   a) introducing said hydrocarbon into said fluidizing medium to permit an increase in the cooling capacity of the fluidizing medium to a level in the range of from 42 Btu/lb to 110 Btu/lb;
   b) increasing the rate of withdrawal of polymer product to above 500 lb/hr-ft$^2$; and
   c) maintaining the ratio of fluidized bulk density to settled bulk density above 0.59.

29. The process in accordance with claim 28 wherein the liquid phase comprises a level of liquid in the range of from 20 to 50 weight percent based on the total weight of the fluidizing medium.

30. The process of claim 1 wherein the level of liquid is in the range of from 20 to 50 weight percent based on the total weight of the fluidizing medium.

31. The process in accordance with claim 1 wherein the level of liquid is in the range of from 20 to 44.2 weight percent based on the total weight of the fluidizing medium.

32. The process in accordance with claim 1 wherein the level of liquid is in the range of from 22 to 30 weight percent based on the total weight of the fluidizing medium.

33. The process in accordance with claim 1 wherein the level of liquid is in the range of from 25 weight percent to 38.6 weight percent based on the total weight of the fluidizing medium.

34. The process in accordance with claim 24 wherein the enthalpy change is in the range of from 60 Btu/lb to 100 Btu/lb.

35. The process in accordance with claim 24 wherein the enthalpy change is in the range of from 73 Btu/lb to 100 Btu/lb, 36. The process in accordance with claim 24 wherein the level of liquid in the fluidizing medium based on the total weight of the fluidizing medium is in the range of from 30 to 50 weight percent, 37. The process in accordance with claim 24 wherein the level of liquid is in the range of from 20 to 44.2 weight percent based on the total weight of the recycle stream.

38. The process in accordance with claim 24 wherein the level of liquid is in the range of from 22 to 30 weight percent based on the total weight of the recycle stream.

39. The process in accordance with claim 24 wherein the level of liquid is in the range of from 25 to 38.6 weight percent based on the total weight of the recycle stream.

40. The process in accordance with claim 28 wherein the level of liquid in the fluidizing medium based on the total weight of the fluidizing medium is in the range of between from 30 to 50 weight percent.

41. The process in accordance with claim 28 wherein the level of liquid is in the range of from 20 to 44.2 weight percent based on the total weight of the recycle stream.

42. The process in accordance with claim 28 wherein the level of liquid is in the range of from 22 to 30 weight percent based on the total weight of the recycle stream.

43. The process in accordance with claim 28 wherein the level of liquid is in the range of from 25 to 38.6 weight percent based on the total weight of the recycle stream.

* * * * *